Jan. 7, 1941.　　　　H. BRÜNE　　　　2,228,048
DISCHARGING DEVICE
Filed Oct. 13, 1937　　　2 Sheets-Sheet 1
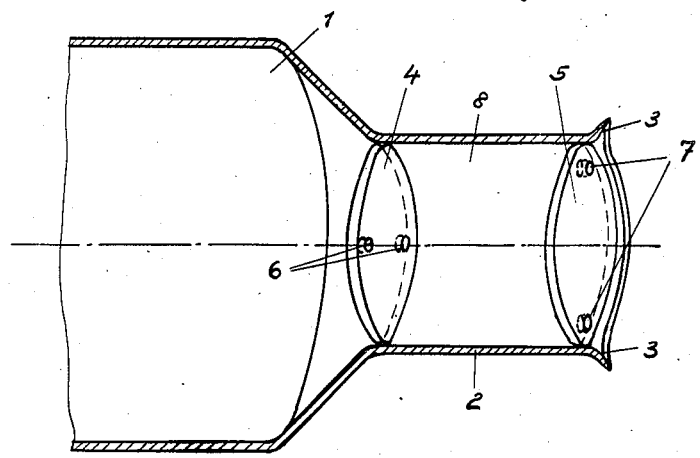
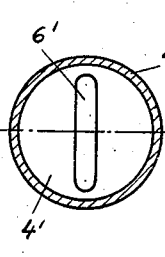 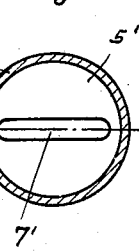 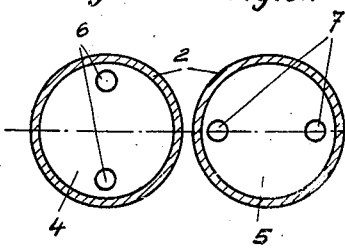
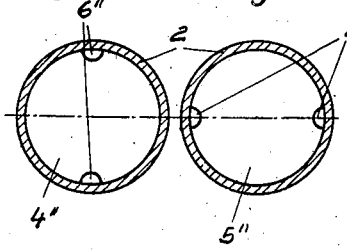 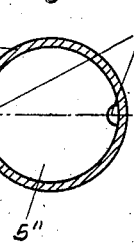 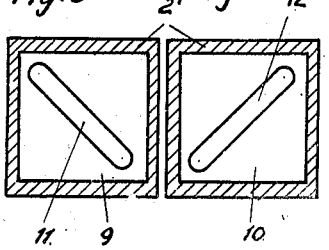
Inventor:
Herbert Brüne.
By William C. Linton
Atty.

Jan. 7, 1941. H. BRÜNE 2,228,048
DISCHARGING DEVICE
Filed Oct. 13, 1937 2 Sheets-Sheet 2
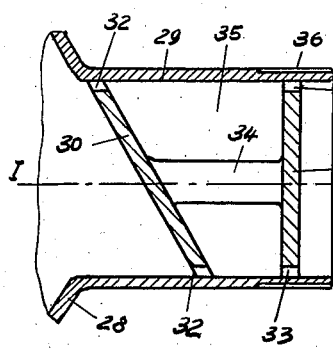
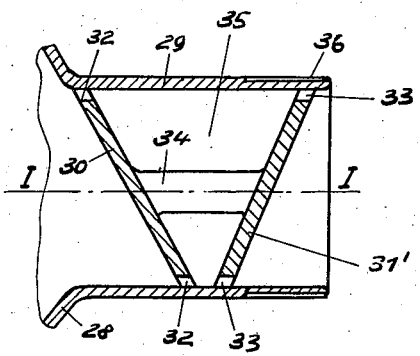
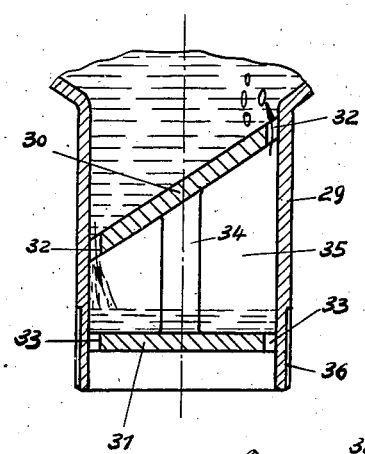
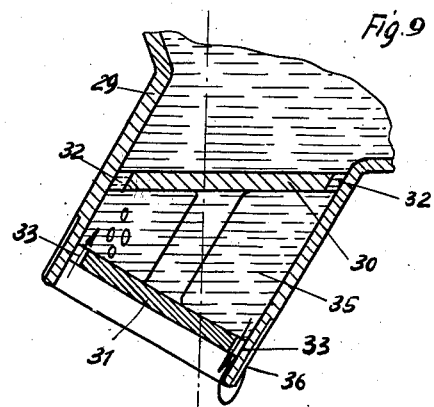
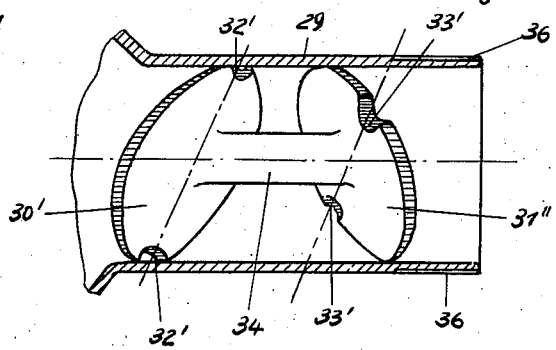
Inventor.
Herbert Brüne
By William C. Linton
Atty.

Patented Jan. 7, 1941

2,228,048

UNITED STATES PATENT OFFICE 2,228,048

DISCHARGING DEVICE

Herbert Brüne, Dresden, Germany

Application October 13, 1937, Serial No. 168,826
In Germany May 8, 1937

7 Claims. (Cl. 221—147)

This invention relates to a device for discharging definite amounts of liquid from vessels, such as bottles, etc. and can be arranged for instance in the neck of a bottle or attached as a separate element to a vessel or connected with the latter by a piping.

The object of the invention is to make possible the discharge of definite quantities of liquid and, further, to subdivide these quantities into single drops of equal size.

According to the invention, this object is attained by disposing at the opening of the vessel a measuring chamber limited by two bottoms provided with openings which substantially lie each on an assumed straight line. To permit the liquid to pass into the chamber and to make possible the discharge of the measured quantity of liquid from the chamber the two straight lines must not be parallel, but otherwise may occupy any position in space. The device can be operated in a very simple manner by turning the vessel about its longitudinal axis into two different positions or by moving the vessel by inclining its longitudinal axis or by combining both motions.

The two bottoms including the chamber may be inclined or parallel to one another. In the first instance, the assumed straight lines on which the openings are positioned across each other or intersect when extended, whilst at parallel arrangement of the bottoms the straight lines on which the openings lie cross each other. The bottoms may be inclined relative to the longitudinal axis in various degrees and the number of their openings may be chosen at will, though at least two openings are required which are arranged as far as possible from one another. The openings may have the form of slots.

The chamber formed by the two bottoms may be integral with the outlet. It is further possible to construct the device so that the device can be loosely inserted in the outlet of a vessel or forms a separate and independent part thereof.

By way of example, several embodiments of the invention are illustrated in the accompanying drawings, in which Figure 1 is a section of the upper portion of a bottle;

Fig. 2 is a top detail view of one of the bottoms mounted within the bottle chamber.

Fig. 2a is a top detail view of a second bottom to cooperate with the bottom shown in Fig. 2 and positioned relative thereto as they are positioned within the bottle chamber.

Fig. 3 is a top detail view of a modified form of bottom mounted within the bottle chamber.

Fig. 3a is a top detail view of a second bottom to cooperate with the bottom shown in Fig. 3 and positioned relative thereto as they are positioned within the bottle chamber.

Fig. 4 is a top detail view of a second modification of a bottom mounted within the bottle chamber.

Fig. 4a is a top detail view of a second bottom to cooperate with the bottom shown in Fig. 4 and positioned relative thereto as they are positioned within the bottle chamber.

Fig. 5 is a top detail view of a third modification of a bottom mounted within the bottle chamber.

Fig. 5a is a top detail view of a second bottom to cooperate with the bottom shown in Fig. 5 and positioned relative thereto as they are positioned within the bottle chamber.

Figs. 6 and 7 are sectional views of modified forms of a bottle outlet; Figs. 8 and 9 show the use of the vessel according to Fig. 6; Fig. 10 shows another form of discharging device;

In the construction according to Fig. 1 the bottle 1 has a neck 2 and extends at its end into two oppositely disposed spouts 3. In the neck 2 two bottoms 4,5 are inserted which possess bores 6,7 passing entirely through the bottoms, the assumed straight line between the bores 6 being rectangularly arranged to the assumed straight line between the bores 7. When the bottle 1 is held so that the bores 6 are superposed in vertical direction, the bores 7 will be positioned horizontally side by side. In this position air can pass out of the chamber 8 formed between the two bottoms 4,5 through the upper one of the openings 6 into the vessel 1, whilst the liquid contained in the vessel 1 flows through the lower bore 6 into the chamber 8. As the bores 7 of the bottom 5 are on the same level, they are subjected to equal pressure, so that liquid cannot flow out and air cannot enter. During further tilting of the vessel the chamber 8 will be completely filled. When the vessel 1 is turned in this inclined position about its longitudinal axis to the extent of 90°, the bores 6 will be in horizontal and the bores 7 in vertical position, as indicated in Fig. 1, and with a pressure drop or head will develop between the two bores 7, which permits the liquid contained in the chamber 8 to flow out through the lower bore 7 into the space 8. As the bores 6 are subjected to the same presure, liquid cannot flow out again from the bottle 1.

Fig. 3 and Fig. 3a show again, for better understanding, the position required for the two bottoms 4,5 to permit the liquid to flow from the vessel 1 into the chamber 8.

In the constructions shown in Fig. 2 and Fig. 2a the bottoms 4',5' possess transverse slots 6',7' instead of the bores 6,7, though the effect is the same as before.

In the modification shown in Fig. 4 and Fig. 4a the bores 6'',7'' are located directly on the wall 2 of the neck of the bottle, whilst the bottoms 4'',5'' are in the same position as in the construction shown in Fig. 1.

In the construction shown in Fig. 5 and Fig. 5a the neck 2' has a rectangular cross section and accommodates bottoms 9, 10 of corresponding shape which possess diagonal outlet slots 11, 12.

Whilst in the constructions just described the bottoms are always parallel to one another and disposed vertically to the axis of the bottle and the openings in the bottoms lie on intersecting lines, the bottoms shown in Figs. 6 to 9 are arranged obliquely to the axis of the bottle and the openings lie on straight lines which either cross each other in space or intersect when extended. In the construction shown in Figs. 6 to 9 the two lines intersect, whilst in the modification according to Fig. 10 the two lines cross each other in the space and the two bottoms are arranged askew.

Constructions as shown in Figs. 6 to 9 afford the advantage that the vessel need only be tilted instead of requiring tilting and turning to divide off liquid.

The bottle 28 has a neck 29, in which the bottoms 30, 31 are inserted, as shown in Figs. 6 to 9. As shown in Figs. 6, 8 and 9, the bottom 31 is located vertically to the axis of the bottle and the bottom 31', shown in Fig. 7, obliquely to the axis of the bottle. The bottom 30 has openings 32 and the bottom 31 openings 33. Both bottoms are exchangeably disposed in the neck 29 and for this purpose connected by a bar 34. The operation of the device is shown in Figs. 8 and 9. To pass liquid from the inside of the bottle into the space 35 formed by the bottoms 30, 31 the bottle 28 is tilted about an axis vertically disposed to the plane of the drawing into the position shown in Fig. 8. In this position, owing to the difference in pressure between the two openings 32 of the bottom 30, the air can escape from the space 35 through the now elevated opening 32 of the bottom 30 into the bottle, whilst the liquid can flow through the now lowered other opening 32 into the chamber 35. No liquid can flow out through the openings 33 of the bottom 31, as both openings are on the same level and there is no difference in pressure between them. Only after the bottle is further tilted and occupies the position shown in Fig. 9 a difference in pressure between the two openings 33 of the bottom 31 is produced. The bottom 30 will then be in horizontal position, so that liquid cannot flow any more out of the vessel and only the chamber 35 is emptied.

When both bottoms are inclined relative to the longitudinal axis of the bottle, as indicated in Fig. 7, it is necessary to tilt the bottle in such manner that first the bottom 31' is placed in horizontal position. For the purpose of emptying the chamber 35 which was filled in the first position the bottle can then be tilted to such an extent that the outer bottom 31' is inclined and the inner bottom 30 in horizontal position.

Approximately the same mode of operation prevails if, as shown in Fig. 10, the bottoms 30' and 31'' are askew and the openings 32' and 33' of the bottoms lie on axes that cross one another. To divide off liquid the bottle must be tilted, as previously described, in such manner that the bottoms, in proper sequence, lie once on a horizontal and then again on an inclined plane.

To prevent drops from spreading on the outside of the neck of the bottle when emerging from the chamber 35 during dividing off of a quantity of liquid, which would cause differences in the size of the drops, the neck 29 is provided on its outer circumference with grooves 36 which produce a capillary effect and extend parallel to one another. Owing to this capillary action the outer surface of the neck is uniformly wetted during the emergence of drops and the drops formed have the same size.

I claim:

1. A device for discharging measured amounts of liquid from vessels, as bottles, etc., comprising a vessel for the liquid, an outlet forming part of the vessel, a measuring chamber connecting with said outlet, a pair of partitions for limiting said measuring chamber, apertures formed in each of said partitions, the apertures of each partition being substantially arranged along an assumed straight line extending transversely across each partition and the line thus formed on one partition being at an angle to the other.

2. A device according to claim 1, in which said two partitions are inclined relative to one another.

3. A device according to claim 1, in which said two partitions are inclined relative to one another and the lines formed by the apertures are disposed in the same plane and intersect when extended.

4. A device according to claim 1, in which said two partitions are inclined relative to the longitudinal axis of the vessel.

5. A device according to claim 1, in which one of the partitions is disposed in a plane positioned vertically to the longitudinal axis of the vessel, and the other partition is positioned inclined relative thereto.

6. A device according to claim 1, in which the apertures in each partition consist of at least two bores passing through the partition and arranged at the greatest possible distance from each other.

7. In a device according to claim 1, a support for the partitions forming with them a unit which can be loosely inserted in the outlet of the vessel.

HERBERT BRÜNE.